Figure 1:
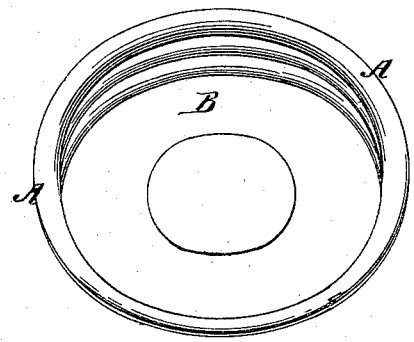

L. R. BOYD.
Preventing Corrosion of Metallic Caps.

No. 88,439.  
Patented March 30, 1869.

Witnesses  
Geo. Rothwell  
C. C. Theaker

Inventor  
Lewis R. Boyd  
By E. W. Conyers  
Atty

UNITED STATES PATENT OFFICE.

LEWIS R. BOYD, OF NEW YORK, N. Y.

IMPROVED MODE OF PREVENTING CORROSION IN METALLIC CAPS.

Specification forming part of Letters Patent No. 88,439, dated March 30, 1869.

*To all whom it may concern:*

Be it known that I, LEWIS R. BOYD, of the city, county, and State of New York, have invented a new and useful Improvement in Means for Preventing Corrosion of Metallic Caps or Covers, especially such as are designed for fruit-jars, preserving-cans, and analogous articles; and I hereby declare that the following is a full, clear, and exact description of the same, reference being had to the drawing which accompanies and forms a part of this specification.

Figure 2:
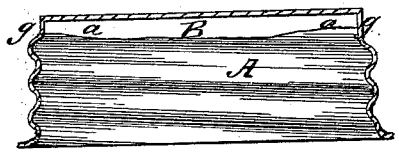

Of this drawing, Figure 1 is a plan of a metallic cap of that class which is suitable for a fruit-jar, the cap being shown inverted, so as to represent the inside thereof, and illustrate the mode of application to it of the glass lining hereinafter referred to. Fig. 2 is a vertical section through the center of the same cap.

Similar letters in the figures denote similar parts.

Heretofore caps or covers for the purposes mentioned have ordinarily been made either wholly of glass or wholly of metal. Those made wholly of glass are very expensive, and are not prefectly adapted to fit closely enough upon the jar or other vessel to render the same thoroughly air-tight. For these reasons they have of late years been almost completely superseded by metallic caps. These latter, although they are sufficiently cheap and can easily be made to close the jar or vessel air-tight, have been found to be objectionable, because after a filled jar closed with one of them has stood for a little time its contents are often observed to be affected by the metallic material of the cap, so that a quite perceptible taste is frequently imparted to them.

The object of my improvement is to remedy this defect in metallic caps of the kind referred to; and to this end it consists in combining with a cap formed either of thin soft metal or of other proper material, in the usual or in any suitable manner, and in permanently securing to the bottom of the same, a glass plate or partial lining, so arranged that the said glass shall be the only portion of the cap which at any time comes in contact with the contents of the jar. By this means all the advantages of the cheap metallic cap are retained, and the danger of a disagreeable flavor being imparted to the articles contained in the jar is entirely obviated, while the slight additional cost of the glass plate or lining will not practically be found to retard its introduction into use.

To enable others to employ my invention, I will describe the mode of its application.

A, Fig. 1, is an example of a screw-cap suitable for a fruit or preserving jar. It is made of thin metal, and is preferably manufactured in the shape and manner of the well-known cap employed with the so-called "Mason" jar, and serves to illustrate the practical method of carrying out my improvement, though any other kind of cap of suitable construction will answer as well.

Into the bottom of this cap the plate or partial lining B, made of glass and of any desired thickness, and of any preferred cross-section at $d\ d$, is fitted closely, a slight shoulder to secure it firmly in place, as seen at $g\ g$, Fig. 2, being, if preferred, spun in the cap near the bottom, or it may be retained in position in any other convenient way; but I prefer that it should be so secured as to form a permanent part of the cap.

If desired, the plating or partial lining of the cap may be made of other material than glass—for instance, of any suitable vitreous or earthen or other substance which is adapted to be secured to the cap, and which will not cause the injurious flavor referred to; but I prefer to employ glass, because it is more convenient, and because it renders the articles more acceptable to the public.

It will be seen that by this mode of combining the glass or equivalent with the cap no portion of the contents of the jar can, under any circumstances, come into contact with any metallic material, but that they will at all times be surrounded by a glass surface, or one equivalent thereto, and consequently no deleterious taste can be produced. At the same time the application of the glass lining imparts a somewhat ornamental appearance to the cap.

Having thus described my invention, what I claim, and desire to secure by Letters Patent, is—

The new article of manufacture consisting of a metallic cap or cover for fruit-jars, preserving-cans, and other analogous articles, when the same is provided with a plating or partial lining of glass, or its equivalent, combined therewith, and operating substantially in the manner and for the purposes set forth.

LEWIS R. BOYD.

Witnesses:
CHAS. D. COOMBS,
JOHN COCHRANE.